H. PICQ.
Apparatus for Transmitting Power by Fluids.
No. 158,305. Patented Dec. 29, 1874.
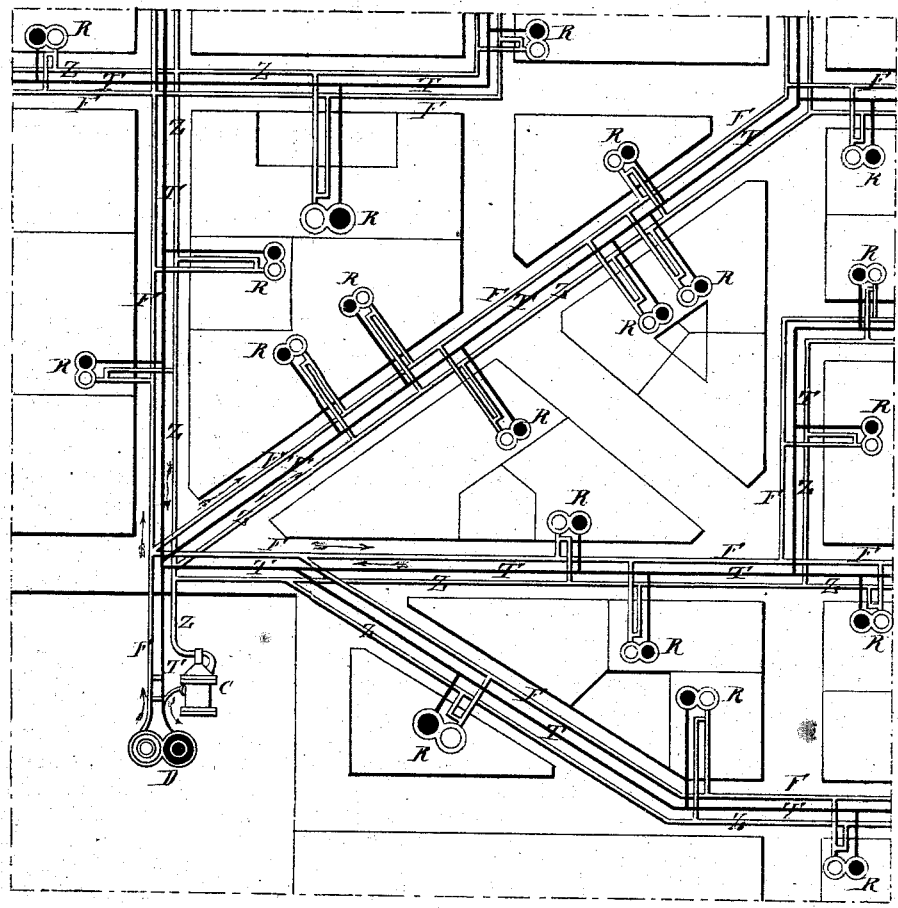
Witnesses, Hubert Howson
John K Rupertus
Henry Picq
By his Attys.
Howson and Son

UNITED STATES PATENT OFFICE.

HENRY PICQ, OF PARIS, FRANCE.

IMPROVEMENT IN APPARATUS FOR TRANSMITTING POWER BY FLUIDS.

Specification forming part of Letters Patent No. 158,305, dated December 29, 1874; application filed March 1, 1873.

*To all whom it may concern:*

Be it known that I, HENRY PICQ, architect, of Paris, France, have invented a System of Transmitting the Power by Fluids, of which the following is a specification:

My invention consists in the employment, as a medium for transmitting motive power, of a fluid having a continuous circulation through communicating pipes or channels as well as through the mechanism or apparatus to which it imparts motion.

The mode of carrying my invention into effect will be apparent from an inspection of the diagram, in which D represents an apparatus which I call a distributer; R R R, the different machines to be operated; F, pipes or channels for conducting to the machines the fluid, which is a medium for transmitting power; and T, pipes or channels, through which the fluid, after passing through the machine, is returned to the distributer.

The distributer D may be operated by tide-power, water-power, air, or any suitable motor, and is so constructed as to insure a forcible and continuous circulation of water, or any other fluid, outward through the pipes F, through the machines R, imparting motion to the latter, and back through the pipes T. In order that the stoppage of any one of the engines R may not increase the pressure of the fluid in the others, a return-pipe, Z, may be used in connection with the pipe F and a three-way cock, by which the fluid, otherwise flowing to any one of the engines, may be conducted back, through what I term a regulator, C, to the distributer. This regulator consists of a cylinder containing a piston bearing upon springs, which are compressed as the piston is forced back by the pressure of the fluid, so as to uncover an opening, through which the fluid passes to the distributer.

I claim—

The combination of a series of pipes, F, and a second series of pipes, T, by which a fluid may be conducted to and from an engine, or series of engines, and an apparatus communicating with both series of pipes, and constructed so as to force the fluid outward through one series of pipes, and back through the other, all as set forth.

In testimony whereof I have signed my name to this specification in the presence of two subscribing witnesses.

HENRY PICQ.

Witnesses:
 NIMÉ MÉHU,
 EMILE RICHARD.